US012638068B2

(12) United States Patent
Scheidt et al.

(10) Patent No.: US 12,638,068 B2
(45) Date of Patent: May 26, 2026

(54) ELECTROMECHANICAL CYLINDER

(71) Applicant: HYDAC Systems & Services GmbH, Sulzbach / Saar (DE)

(72) Inventors: Michael Scheidt, Riegelsberg (DE); Felix Anton Schwarz, Saarbrücken (DE)

(73) Assignee: HYDAC SYSTEMS & SERVICES GMBH, Sulzbach/Saar (DE)

( * ) Notice: Subject to any disclaimer, the term of this patent is extended or adjusted under 35 U.S.C. 154(b) by 93 days.

(21) Appl. No.: 18/711,794

(22) PCT Filed: Dec. 7, 2022

(86) PCT No.: PCT/EP2022/084788
§ 371 (c)(1),
(2) Date: May 20, 2024

(87) PCT Pub. No.: WO2023/126138
PCT Pub. Date: Jul. 6, 2023

(65) Prior Publication Data
US 2025/0012346 A1     Jan. 9, 2025

(30) Foreign Application Priority Data
Dec. 28, 2021    (DE) .................... 10 2001 006 442.9

(51) Int. Cl.
*F16H 25/20*          (2006.01)
(52) U.S. Cl.
CPC ...  *F16H 25/2015* (2013.01); *F16H 2025/204* (2013.01)

(58) Field of Classification Search
CPC ......................... F16H 25/204; F16H 2025/204
See application file for complete search history.

(56) References Cited

U.S. PATENT DOCUMENTS

| | | |
|---|---|---|
| 9,415,557 B2 | 8/2016 | Furukawa |
| 11,752,721 B2 * | 9/2023 | Ishida ..................... B30B 15/28 |
| | | 100/99 |
| 2022/0042581 A1 | 2/2022 | Kramer |
| 2022/0324190 A1 | 10/2022 | Ishida |

FOREIGN PATENT DOCUMENTS

| | | |
|---|---|---|
| DE | 20108706 U1 | 8/2001 |
| DE | 10 2019 004 690 A1 | 1/2021 |
| JP | H06344187 A | 12/1994 |
| WO | 2021044926 A1 | 3/2021 |

OTHER PUBLICATIONS

Search Report for International Application No. PCT/EP2022/084788, 4 pages, Mar. 22, 2023.

* cited by examiner

*Primary Examiner* — Gregory Robert Weber
(74) *Attorney, Agent, or Firm* — Slayden Grubert Beard PLLC

(57)          ABSTRACT

The disclosure relates to an electromechanical cylinder with a screw drive which converts the introduced motor torque of an electric motor into a linear movement for an actuating part, wherein at least one force acting on the actuating part is detected by means of a sensor device.

13 Claims, 3 Drawing Sheets

ELECTROMECHANICAL CYLINDER

CROSS-REFERENCE TO RELATED APPLICATIONS

This application claims priority to German Patent Application No. DE 10 2021 006 442.9, filed on Dec. 28, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to an electromechanical cylinder with a screw drive which converts the introduced motor torque of an electric motor into a linear movement for an actuating part.

DE 10 2019 004 690 A1 discloses a linear drive system with an actuating part that can be driven in translation by means of an electric motor, which is coupled to a mechanical energy accumulator such that, in the event of a loss of energy at the electric drive or in emergency operation, respectively, the actuating part assumes a predefinable position and exerts an actuating force in this process. In this manner, a linear drive system in the form of an electromechanical cylinder is created which carries out its function without disruption even during long-lasting operation and free from any changes to the environmental conditions, such as temperature. By using a mechanical energy accumulator instead of an otherwise traditional gas accumulator, this provides a purely mechanical solution which accordingly requires no additional maintenance effort to operate, such as, for example, refilling the working gas in the known gas spring.

SUMMARY

A need exists to improve electromechanical cylinders or linear drive systems respectively from the perspective of their functionality.

The need is addressed by the subject matter of the independent claim(s). Embodiments of the invention are described in the dependent claims, the following description, and the drawings.

DESCRIPTION

Figure 1:
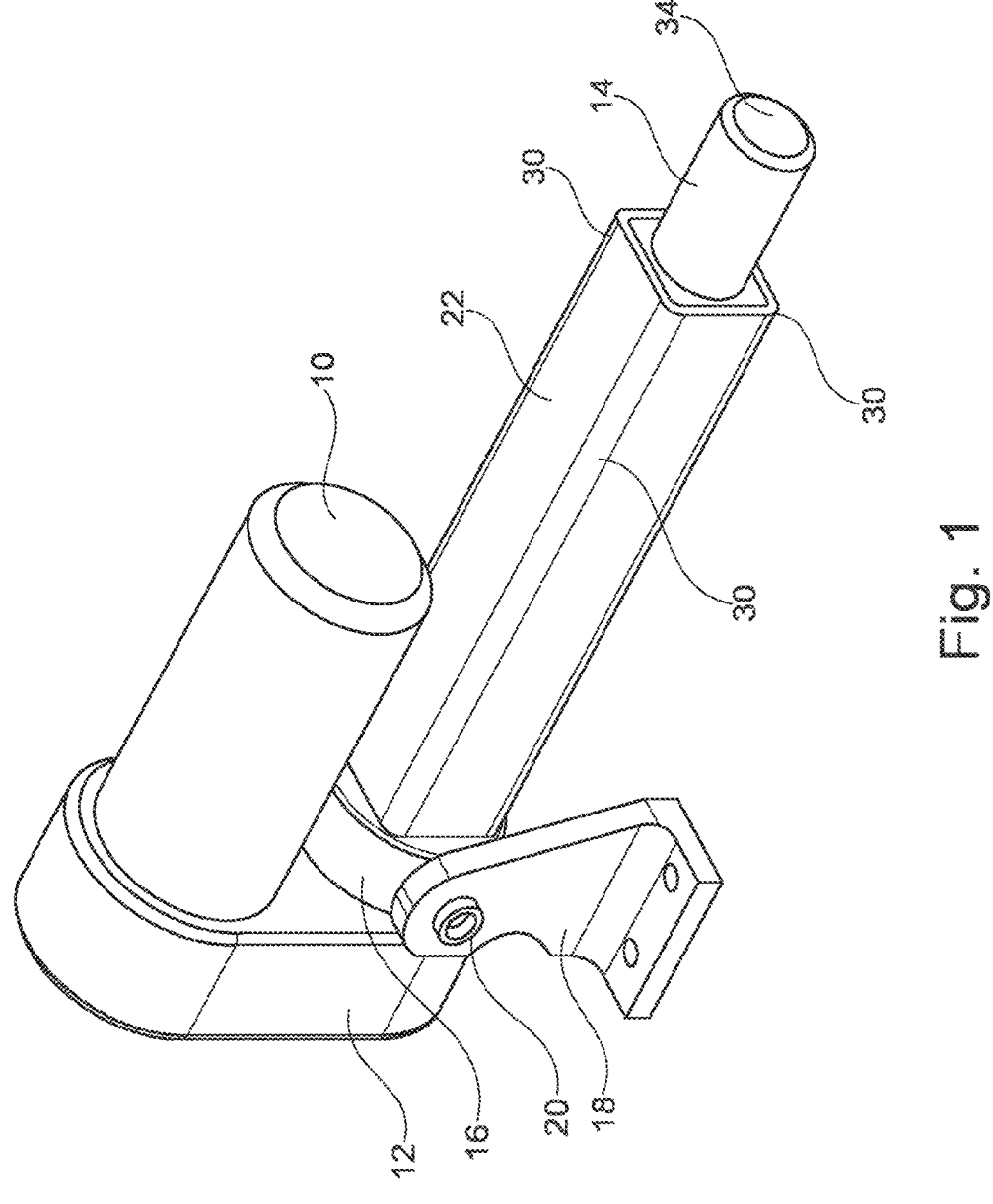
FIG. 1 shows a perspective view of an example electromechanical cylinder according to the teachings herein.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, using a sensor device, at least one force acting on the actuating part of the linear drive system is detected. An integral force measurement in connection with electromechanical actuators or cylinders respectively is achieved such that it is possible to monitor or determine the actuating part of the cylinder in the form of an actuating rod or a so-called thrust tube in connection with the intended force transmission onto a third-party component and/or in some cases, an inadmissibly high force application by such a third-party component. In particular, it is possible to determine whether the force to be applied by means of the screw drive on the actuating part is sufficient, as part of an extension and/or retraction operation, to ensure safe actuation on the third-party component and whether, in particular, the motor torque to be applied by the electric drive is sufficient for this purpose or needs to be increased accordingly by increasing the motor power. By determining the force applied to the actuating part, the force for the actuating part, which may not exceed predefined limits for functionally reliable operation, can also be established directly. In particular, the screw drive comprises the threaded spindle and transmission nut components.

In some embodiments of the electromechanical cylinder, it is provided that the sensor device comprises a sensor that detects a tensile force and/or a sensor that detects a compressive force on the actuating part. In this manner, the forces arising in the two main feed directions 'extension and retraction' can be determined, one or the other feed direction being predefined with a left or right-handed screw drive. The corresponding force determination via the sensor device is then also provided if the actuating part acting on a third-party component is exposed to the respective load situation of said component.

It has proved to be particularly beneficial to manufacture the respective sensor of the sensor device by means of strain gauges which are suitable for detecting compressive and stretching deformations. Thus, strain gauges of the conventional design can already change their electrical resistance in the event of minor deformations and can be used as strain sensors in this respect. They are freely available on the market as standardised purchased parts and can be furnished with corresponding measurement wiring and secured, for example glued, to almost any components, and even if these are only intended to deform to a minimum extent under loading, this deformation is in any event sufficient to detect a change in the resistance on the respective strain gauge which can be assessed by measurement technology.

In some embodiments, it is provided that the screw drive comprises a transmission unit which couples the electric motor to a threaded spindle, which, via a threaded nut, moves a guide body on which the actuating part engages. Particularly when using a belt transmission, a traction drive is provided which can be produced in a cost-effective manner and requires little installation space on the linear drive unit in the form of the electromechanical cylinder. In particular, this ensures quiet and low-noise operation with minimal maintenance and, if overloading does occur inadvertently for short periods, this can be compensated by what is referred to as belt slippage. Furthermore, the belt transmission only requires a minimal installation weight during implementation, which is beneficial for the electromechanical cylinder during handling if this is transported manually and needs to be fitted to other machine parts for operating purposes. A different type of transmission unit can also be used in production instead of a belt transmission. Thus, instead of an angular drive concept, it is also possible to produce a rectilinear drive concept in which the drive shaft of an electric motor is arranged concentrically with respect to the threaded spindle to which it can be coupled by means of a coupling.

In some embodiments of the electromechanical cylinder, it is provided that the actuating part is formed by a thrust tube, which at least partially surrounds the threaded spindle and which is guided in a housing tube in a longitudinally displaceable manner by means of a guide device using the guide body. By virtue of the housing tube, the thrust tube is protected from contamination from the environment. As the thrust tube surrounds the threaded spindle on the outside in each of its displacement states, the sensitive thread turns of the threaded spindle are also protected in this manner from adverse effects arising from the environment. Due to the hollow design of the thrust tube, only low masses also need to be displaced in a linear manner by means of the screw drive, which helps to reduce the drive power required by the electric motor.

In some embodiments of the electromechanical cylinder, it is provided that the guide device comprises the guide body which is arranged between the threaded spindle and the actuating part and forms an anti-rotation device opposite the housing tube as part of a longitudinal guide. In this manner, an undesirable relative rotational movement between the housing and the thrust tube is prevented, the guide body being guided in a longitudinally displaceable manner in the housing tube. Depending on the direction of rotation of the threaded spindle, the respective retraction or extension movement for the actuating part is carried out in the form of the thrust tube.

In some embodiments of the electromechanical cylinder, it is provided that the sensor device is received in a bearing device, which is arranged between a transmission housing receiving the transmission unit and the housing tube and through which device the threaded spindle, which is mounted in the bearing device by means of bearing points in the axial and radial direction, passes.

For example, in this process it is also provided that one and/or the other sensor is in each case received between an axial bearing and a shared radial bearing in the bearing device. In this case, the bearing device may be designed in the form of a bearing block arranged in a stationary position and may fulfil two different functions in a space-saving manner in the central position, namely providing a support for the rotatable threaded spindle in one case and also forming a receiving space for the sensor device with its respective sensor.

In this case it is for example provided that the respective sensor is formed by an annular body which comprises the respective strain gauges and through which the threaded spindle passes. In a particularly beneficial manner, the aforementioned annular bodies form a kind of membrane which is subject to the forces on the actuating part, via which strain gauges attached to the membrane in each case allowing loading to be recorded in near time. Due to the membrane-like nature of the annular body, this also ensures that, if no force is applied, the membrane is restored to its original state, without the possibility of the measurement result being falsified due to hysteresis phenomena.

In some embodiments, it is provided that, on its side facing the transmission unit, the threaded spindle is secured by a slotted nut in the axial displacement direction, which is supported on an adjacently arranged axial bearing, and that, on the opposite side of the bearing device, the threaded spindle lies flat on the other axial bearing. In this manner, the force received on the respective axial bearing at the adjacent annular bodies of the sensor device can be transmitted in a linear fashion such as to thus provide information, depending on the force received, as to the functionality of the individual bearing points inside the bearing block and, in this manner, if a bearing seems to be failing, this can be replaced by a new bearing if necessary. This therefore has no parallel in the prior art.

The electromechanical cylinder according to the teachings herein is explained in greater detail below with the aid of an embodiment and with reference to the drawings, which are in outline and not to scale. Specific references to components, process steps, and other elements are not intended to be limiting. Further, it is understood that like parts bear the same or similar reference numerals when referring to alternate FIGS.

FIG. 1 shows an electromechanical cylinder, which is also referred to as a linear drive system, with an electric motor 10 and a transmission unit 12, which converts the applied motor torque of the electric motor 10 into a linear movement for an actuating part 14. The accordingly designed electromechanical cylinder is mounted such that it can swivel around an axis of rotation 20 by means of a bearing device 16 in the form of a bearing block by two opposite angle supports 18.

Figure 2:
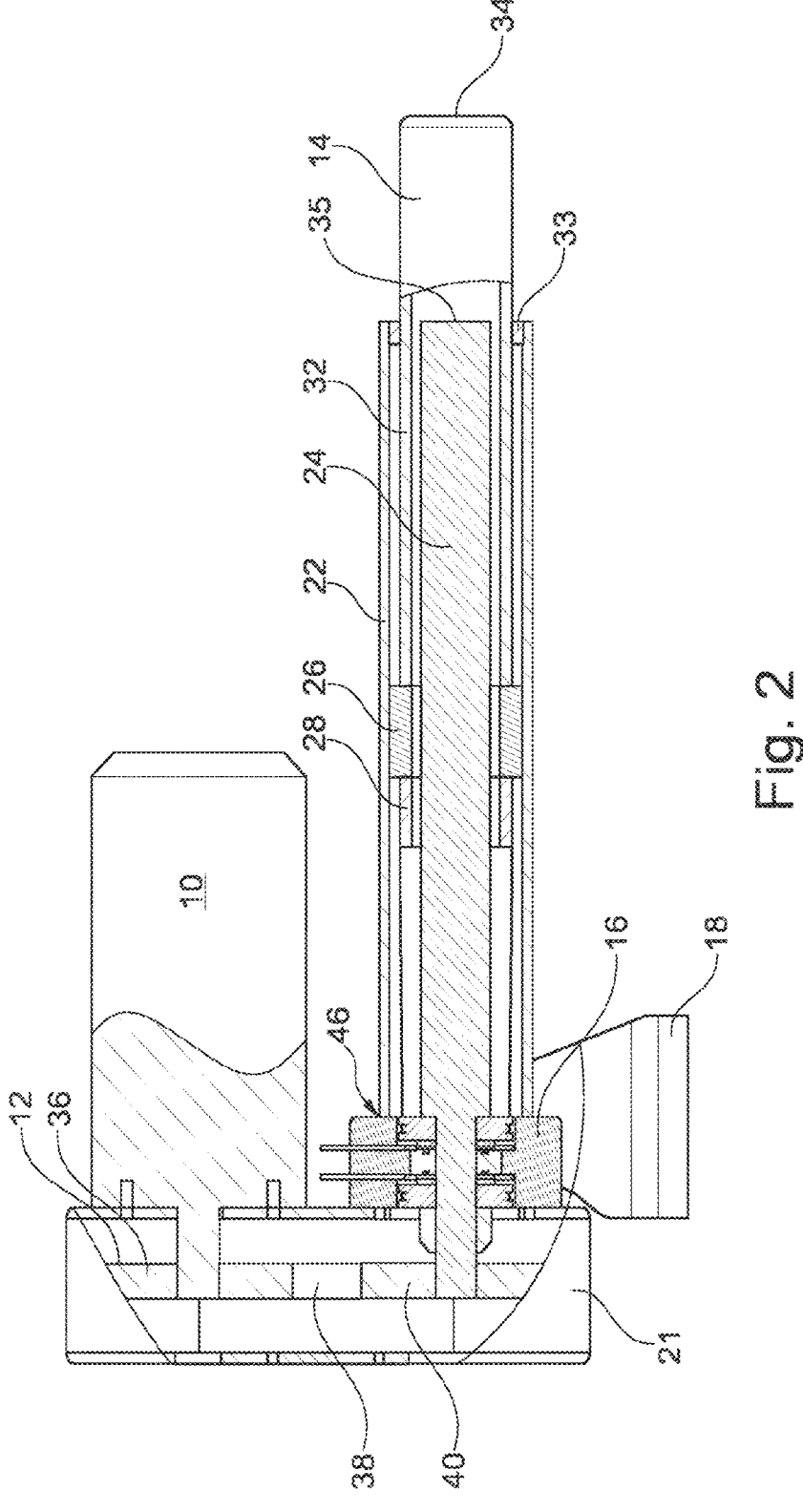
FIG. 2 shows a partial view/partial longitudinal section of the cylinder according to FIG. 1.

As is shown in the sectional view according to FIG. 2, the transmission unit 12 received in a transmission box 21 comprises a threaded spindle 24 guided rotatably in a housing tube 22, said spindle interacting via a threaded nut 28 located in engagement with said spindle with a guide body 26 of a guide device. In the present embodiment, the threaded nut 28 engages with the threaded spindle 24, in that the male thread of the threaded spindle 24 is in permanent engagement with the corresponding female thread of the threaded nut 28 forming the screw drive.

Furthermore, the annular guide body 26 is connected to the free end of the threaded nut 28 facing away from the transmission unit 12, the threaded spindle 24 passing completely through said guide body in its longitudinal direction while maintaining a predefinable gap-like distance. On the outer circumferential side, the guide body 26 is adapted to the inner contour of the housing part 22 as a further part of the guide device, which forms an outer jacket for the cylinder or a spindle housing respectively.

Both the threaded nut 28 and the guide body 26 secured to said nut are accordingly unable to rotate around the longitudinal axis of the threaded spindle 24 but can be moved in a translational manner along this longitudinal axis and as such guided with their outer circumference along the inner wall of the housing tube 22. For this purpose, the housing tube 22 is designed to be hollow on its inside and comprises a non-rotationally symmetrical, in particular a polygonal, for example rectangular or square inner cross-section, in particular with rounded edges 30 at the location of the transition. As such, the outer cross-section of the guide body 26 substantially corresponds to the selected inner cross-section of the housing tube 22.

The threaded spindle 24 is designed as a cylinder rod, which bears the male thread on its outer circumference, which is in engagement with the female thread on the inner circumference of the threaded nut 28. The actuating part 14 forms a thrust tube 32, which is securely connected to the free end, facing the threaded nut 28, of the guide body 26 and can be guided in a longitudinally displaceable manner inside the housing tube 22 in a rotationally fixed manner. In any event, the arrangement is such that, even when the thrust tube 32 is extended to its maximum extent, the guide body 26 with the corresponding threaded nut 28 always remains in the housing tube 22, which, at its free end facing the environment comprises a stop option in the form of an annular edge 33 protruding inwards, against which the guide part 26 is able to move as its outermost limit.

As is also shown in FIG. 1 and FIG. 2, the thrust tube 32 is in any event arranged partially inside the housing tube 22 in each of its displacement positions and protrudes partially with its free end 34, protruding forwards, out of the housing tube 22. In the opposite direction, the thrust tube 32 can retract to a maximum extent into the housing tube 22 until the free end face 35 of the threaded spindle 24 comes into contact or almost into contact with the adjacent opposite inner wall of the thrust tube 32 on the free end 34 thereof. Another option for limiting the retraction movement for the thrust tube 32 is for the threaded nut 28 with its free end face to come into contact or approximately into adjacent contact with parts of the bearing device 16.

A driven pulley 36 is used to transmit the drive power of the electric motor 10, said pulley usually driving a drive pulley 40 that is connected securely to the threaded spindle 24 by means of a belt drive 38. For this purpose, as viewed on FIG. 2, the threaded spindle 24 is reduced in diameter at its left-hand end. The transmission housing 21 surrounds the belt drive 38 and the two pulleys 36, 40. The electric motor 10 and the key parts of the feed cylinder are arranged with their respective longitudinal axes parallel to one another and arranged in a fixed manner on one side on the transmission housing 21 such that they protrude from said housing and are, for example, securely screwed and/or pinned together with said housing.

Figure 3:
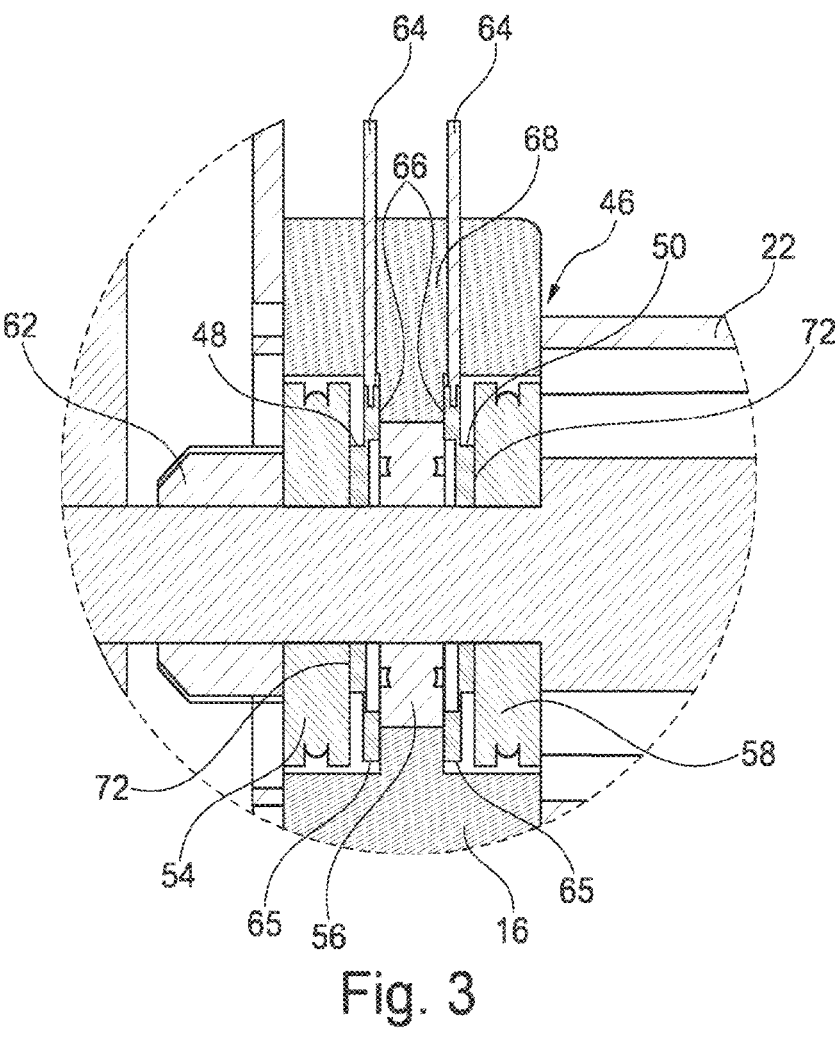
FIG. 3 shows an enlarged view of a detail from FIG. 2.

As is shown in particular in the drawing in FIG. 3, which is enlarged by a factor of two, a sensor device 46 is received in the bearing device 16 or the bearing block in its entirety respectively. The aforementioned sensor device 46 comprises a sensor 48, which detects a tensile force on the actuating part 14 and/or a further sensor 50 that detects a compressive force on the actuating part 14 in the opposite direction. To ensure that such a tensile force can act on the actuating part 14, as shown in FIG. 2, the actuating part 14 must be subject to a right-hand force and, in the event of a compressive force being exerted, the actuating part 14 is loaded on the left-hand side along its longitudinal axis with a corresponding force vector. To ensure that the respective sensor 48, 50 is able to detect the aforementioned forces on the actuating part 14, strain gauges 52 are provided which are only reproduced in one position by way of example in FIG. 4.

As is also shown on FIG. 3, the sensor 48 is supported between the adjacent axial bearing 54 and the bearing block 16. However, the further sensor 50 is supported between the axial bearing 58 and also between the bearing block 16. The respective aforementioned sensor 48 or 50 is supported, as shown on FIG. 3, in the radial direction and at the top outside and the bottom outside on its face on the bearing block 16 such that a force flow directed towards the middle arises. The radial bearing 56 arranged between the two axial bearings 54 and 58 has no contact with the aforementioned sensors 48 and 50 and is merely used to support the threaded spindle 24 during the rotary drive.

In this case, each sensor 48, 50 of the sensor device 46 comprises its own electrical measurement port 64 with which the measurement data can be transmitted to an electronic evaluation system, which is not shown in greater detail.

Figure 4:
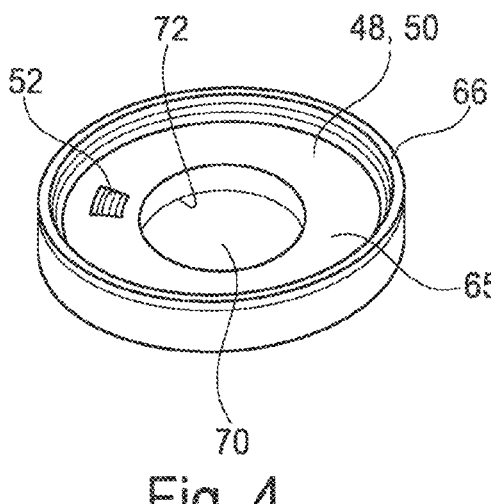
FIG. 4 shows a perspective plan view of an example annular body with attached strain gauges as key components of a sensor.

FIG. 4 then shows the annular structure of a sensor 48, 50 of the same design. The sensor ring 65 has an edge 66 that protrudes upwards on its outer circumference, said edge being supported on a flange-like, annular widening 68 on the inside of the housing wall of the bearing device 16, as shown in FIG. 3, which forms a receiving space for receiving the central radial bearing 56 in a flush manner. In the direction of a central opening 70, through which the threaded spindle 24 passes, a further edge 72 that protrudes downwards, as shown on FIG. 4, is provided adjacently on the opposite side of the edge 66, said edge 72 being supported on the rotating inner ring of the axial bearing 54, 58 for each sensor 48, 50 as shown in FIG. 3.

If pressure is then loaded onto the actuating part 14, a force is exerted on the threaded spindle 24 by the guide body 26 or the threaded nut 28 respectively after establishing freedom from play, said force acting via a cylindrical widening 60 on the rotating inner ring of the axial bearing 58 arranged on the right, and the corresponding force application is applied to the further sensor 50, causing a deformation of the strain gauge arrangement 52 such that, in this manner, the resulting level of deformation can be evaluated as the effect of the compressive force on the actuating part 14. As, with regard to the compressive force applied to the threaded spindle 24 as shown on FIG. 3, a slotted nut 62 moves slightly to the left and is thus relieved, the left-hand axial bearing 54 is also relieved in relation to its inner ring and thus also the sensor 48 arranged on the left. In this case, the aforementioned slotted nut 62 places the composite bearing with bearings 54, 56, 58 and sensors 48, 50 firmly against the widening 60 of the threaded spindle 24.

Conversely, if tensile force is then applied to the actuating part 14, a force acting towards the right is in turn applied to the threaded spindle 24 via the guide body 26 of the threaded nut 28, which loads the slotted nut 62 that is screwed in position and leads to force being exerted to the right onto the rotating inner ring component of the left-hand axial bearing 54. The correspondingly rotating inner ring parts of the axial bearing 54 in turn act on the further edge 72 in the form of the surrounding edge, which is in turn supported in a stationary manner on the annular widening 68 of the bearing device 16 by means of its outer edge 66. As such, this can also lead to a deformation on the annular body 65 shown in FIG. 4 with a corresponding deformation of the strain gauges 52, which generates a measurement signal at the port 64 and provides information about the level of the force applied to the actuating part 14. Due to the annular arrangement of both sensors 48, 50 with their protruding edges 66, 72, once force is no longer applied, a reset immediately takes place again and the strain gauges 52 which are thus no longer deformed or moved provide a measurement signal of zero, in other words the actuating part 14 is free of axial tensile or compressive forces. It is clear that a basic value other than zero can also be used as the starting point for measured value acquisition during the measured value acquisition process.

The aforementioned edges 66 and 72 on the respective sensor ring can also be omitted on at least one side. This thus provides the opportunity to design the disc of the sensor ring 65 opposite the respective axial bearing 54, 58 such that it is flat. To ensure an undisrupted membrane deformation, it is in any event provided that the radial bearing 56 arranged in the centre is selected to have a smaller diameter in terms of its outer circumference than the inner diameter delimited by the edge 66, as shown in the direction of the central opening 70 of the sensor ring 65. Furthermore, the sensor rings 65 arranged in a stationary manner in the bearing device 16 for the tension sensor 48 and the compression sensor 50 are in a position to permit sliding of the inner rings of the respectively assigned axial bearing 54, 58. However, it is also possible to allow the two sensors 48, 50 to rotate along with the threaded spindle 24, in which case the measurement ports 64 transmit the detected measurement values from the strain gauges 52 to the electronic evaluation system in the form of sliding contactors. Furthermore, if necessary, only one sensor 48 or 50 may be used if the intention is to monitor only tensile forces or compressive forces.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. An electromechanical cylinder with a screw drive which converts an introduced motor torque of an electric motor into a linear movement for an actuating part, wherein at least one force acting on the actuating part is detected using a sensor assembly;

the sensor assembly comprises a first sensor that detects a tensile force and a second sensor that detects a compressive force on the actuating part;

the sensor assembly is received in a bearing device, which is arranged between a transmission housing and a housing tube and through which a threaded spindle, which is mounted in the bearing device using bearing points in the axial and radial direction, passes;

the electromechanical cylinder comprises one or more of a first sensor that detects a tensile force and a second sensor that detects a compressive force on the actuating part; and wherein the first sensor and the second sensor are each received in the bearing device between an axial bearing and a shared radial bearing.

2. The electromechanical cylinder of claim 1, wherein one or more of the first sensor and the second sensor detects the respective force on the actuating part using one or more strain gauges.

3. The electromechanical cylinder of claim 2, wherein a transmission unit comprises at least one transmission part, which couples the electric motor to the threaded spindle, which, via a threaded nut, moves a guide body on which the actuating part engages.

4. The electromechanical cylinder of claim 1, wherein a transmission unit comprises at least one transmission part, which couples the electric motor to the threaded spindle, which, via a threaded nut, moves a guide body on which the actuating part engages.

5. The electromechanical cylinder of claim 1, wherein a transmission unit comprises at least one transmission part, which couples the electric motor to the threaded spindle, which, via a threaded nut, moves a guide body on which the actuating part engages.

6. The electromechanical cylinder of claim 5, wherein the actuating part is formed by a thrust tube, which at least partially surrounds the threaded spindle and which is guided in the housing tube in a longitudinally displaceable manner using the guide body.

7. The electromechanical cylinder of claim 6, wherein a guide device comprises the guide body, which is arranged between the threaded spindle and the actuating part and forms an anti-rotation device for the actuating part opposite the housing tube as part of a longitudinal guide.

8. The electromechanical cylinder of claim 6, wherein the first sensor and the second sensor respectively comprises an annular body which bears one or more strain gauges and through which the threaded spindle passes.

9. He electromechanical cylinder of claim 6, wherein, on a side facing the transmission unit, the threaded spindle is secured by a slotted nut in the axial displacement direction, which is supported on an adjacently arranged axial bearing, and wherein, on the opposite side of the bearing device, the threaded spindle lies flat on a second axial bearing with a radial extension.

10. The electromechanical cylinder of claim 5, wherein a guide device comprises the guide body, which is arranged between the threaded spindle and the actuating part and forms an anti-rotation device for the actuating part opposite the housing tube as part of a longitudinal guide.

11. The electromechanical cylinder of claim 10, wherein the first sensor and the second sensor, respectively comprises an annular body which bears one or more strain gauges and through which the threaded spindle passes.

12. The electromechanical cylinder of claim 5, wherein the first sensor and the second sensor, respectively comprises an annular body which bears one or more strain gauges and through which the threaded spindle passes.

13. The electromechanical cylinder of claim 5, wherein, on a side facing the transmission unit, the threaded spindle is secured by a slotted nut in the axial displacement direction, which is supported on an adjacently arranged axial bearing, and wherein, on the opposite side of the bearing device, the threaded spindle lies flat on a second axial bearing with a radial extension.

\* \* \* \* \*